(12) United States Patent
Challener et al.

(10) Patent No.: US 6,654,886 B1
(45) Date of Patent: Nov. 25, 2003

(54) DATA PROCESSING SYSTEM AND METHOD FOR PERMITTING ONLY PREREGISTERED HARDWARE TO ACCESS A REMOTE SERVICE

(75) Inventors: David Carroll Challener, Raleigh, NC (US); Daryl Carvis Cromer, Apex, NC (US); Dhruv Manmohandas Desai, Cary, NC (US); Howard Jeffrey Locker, Cary, NC (US); Andy Lloyd Trotter, Raleigh, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/356,189

(22) Filed: Jul. 16, 1999

(51) Int. Cl.$^7$ .................................................. G06F 11/30
(52) U.S. Cl. ........................ 713/172; 713/168; 709/228; 709/275
(58) Field of Search ................................ 713/172, 173, 713/168, 169, 200, 201, 202; 709/225, 228

(56) References Cited

U.S. PATENT DOCUMENTS

| | | | | |
|---|---|---|---|---|
| 5,664,098 A | * | 9/1997 | Bianchi et al. | 395/186 |
| 6,088,450 A | * | 7/2000 | Davis et al. | 380/25 |
| 6,173,400 B1 | * | 1/2001 | Perlman et al. | 713/172 |
| 6,446,209 B2 | * | 9/2002 | Kern et al. | 713/193 |
| 6,463,534 B1 | * | 10/2002 | Geiger et al. | 713/168 |

* cited by examiner

Primary Examiner—Norman M. Wright
(74) Attorney, Agent, or Firm—Carlos Munoz-Bustamante; Bracewell & Patterson, LLP

(57) ABSTRACT

A data processing system and method are disclosed for permitting only preregistered client computer hardware to access a service executing on a remote server computer system. A log-in token is established including a unique identifier which identifies a particular client computer hardware. The client computer hardware logs-on to the server computer system. Subsequent to the client computer hardware logging-on to the server computer system, the client computer hardware attempts to access the service. During the attempt, the client computer hardware transmits the log-in token to the server computer system. The server computer system utilizes the unique identifier included within the log-in token to determine if the client computer hardware is registered to access the service. In response to a determination that the client computer hardware is registered to access the service, the server computer system permits the client computer hardware to access the service. In response to a determination that the client computer hardware is not registered to access the service, the server computer system prohibits the client computer hardware from accessing the service.

21 Claims, 6 Drawing Sheets

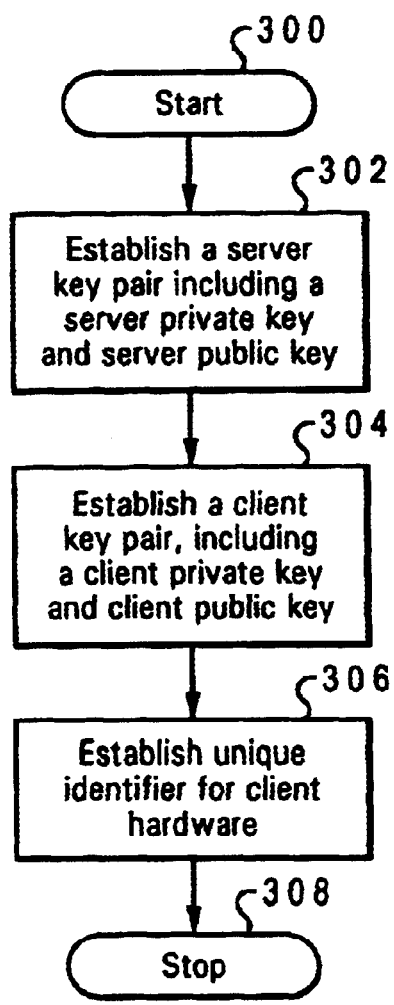
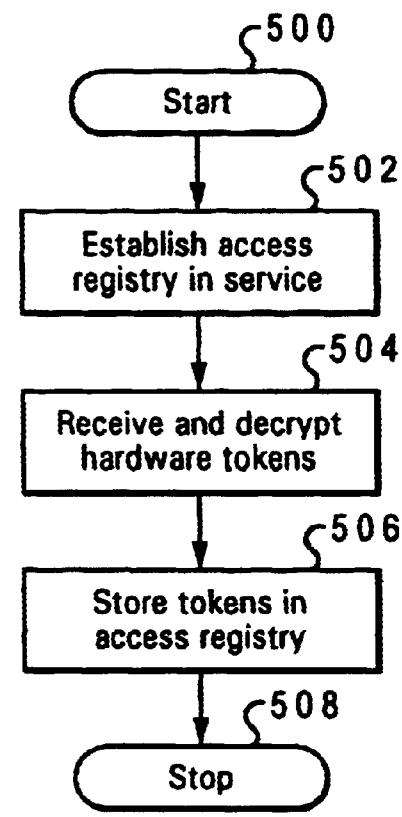
Fig. 3
Fig. 5

DATA PROCESSING SYSTEM AND METHOD FOR PERMITTING ONLY PREREGISTERED HARDWARE TO ACCESS A REMOTE SERVICE

BACKGROUND OF THE INVENTION

1. Field of the Invention

The present invention relates in general to data processing systems and, in particular, to a data processing system and method for permitting only preregistered client hardware to access a service executing on a remote server computer system. Still more particularly, the present invention relates to a data processing system and method for permitting only preregistered client hardware to access a service executing on a remote server computer system by comparing a log-in token to an access registry identifying registered hardware.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

The computer industry is changing rapidly from one where revenue is generated primarily from sales of computer hardware to one where it is generated primarily from sales of services. For example, services may range from maintenance and support to software upgrades or access to databases.

It is important to limit access to these services to only that hardware pre-approved to use the service. Typically, hardware will become approved for use once the service has been purchased for the hardware. For example, warranty may be purchased for particular hardware. Calls could then be made to a warranty service provider for this particular hardware. It is very expensive for the service provider to answer calls regarding hardware for which the warranty service was not purchased, or for which the service expired.

Therefore a need exists for a data processing system and method for permitting only preregistered client hardware to access a service executing on a remote server computer system.

SUMMARY OF THE INVENTION

A data processing system and method are disclosed for permitting only preregistered client computer hardware to access a service executing on a remote server computer system. A log-in token is established including a unique identifier which identifies a particular client computer hardware. The client computer hardware logs-on to the server computer system. Subsequent to the client computer hardware logging-on to the server computer system, the client computer hardware attempts access the service. During the attempt, the client computer hardware transmits the log-in token to the server computer system. The server computer system utilizes the unique identifier included within the log-in token to determine if the client computer hardware is registered to access the service. In response to a determination that the client computer hardware is registered to access the service, the server computer system permits the client computer hardware to access the service. In response to a determination that the client computer hardware is not registered to access the service, the server computer system prohibits the client computer hardware from accessing the service.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

FIG. 3 illustrates a high level flow chart which depicts establishing a unique client identifier for each client and encryption keys in accordance with the method and system of the present invention;

FIG. 5 illustrates a high level flow chart which depicts a server computer system establishing an access registry within a service executing on the server, and receiving log-in tokens from client computer systems in accordance with the method and system of the present invention;

DETAILED DESCRIPTION OF A PREFERRED EMBODIMENT

A preferred embodiment of the present invention and its advantages are better understood by referring to FIGS. 1–7 of the drawings, like numerals being used for like and corresponding parts of the accompanying drawings.

The present invention is a method and system for permitting only preregistered client computer hardware to access a service executing on a remote server computer system. The client computer hardware first log-on to the server executing the service. Then, the client computer hardware registers with the service once the service has been purchased for the particular client hardware. The client hardware registers by transmitting an initial log-in token to the service. The service stores the initial log-in token in an access registry. Therefore, the access registry identifies all preregistered, pre-approved hardware which may access the service.

Thereafter, during subsequent attempts to access the service, the client hardware will transmit a log-in token to the service. The log-in token will be received by the service and compared to the contents of the access registry. If the log-in token matches any of the contents of the registry, the service will transmit an approval to the client hardware to access the service.

The initial log-in token and subsequent log-in tokens include a unique identifier which identifies particular client hardware. The unique identifier may be a serial number for the hardware, contract number, warranty number, or any other identifier which uniquely identifies particular hardware.

The service executing on the remote server may be any type of service for which access needs to be controlled. For example, the service may be an Internet service, such as an Internet provider.

The service may be a warranty-service for the hardware. Calls to a warranty telephone number could be limited to only those users having a current, valid warranty contract. For example, prior to accepting telephone call from a user, the user could be required to have the client hardware call an approval telephone number. In this manner, the client hardware could transmit its log-in token to the warranty service which would then verify whether the particular hardware transmitting a log-in token is currently approved to call for warranty service. If the hardware is approved, a call from a user could then be permitted.

Figure 1:
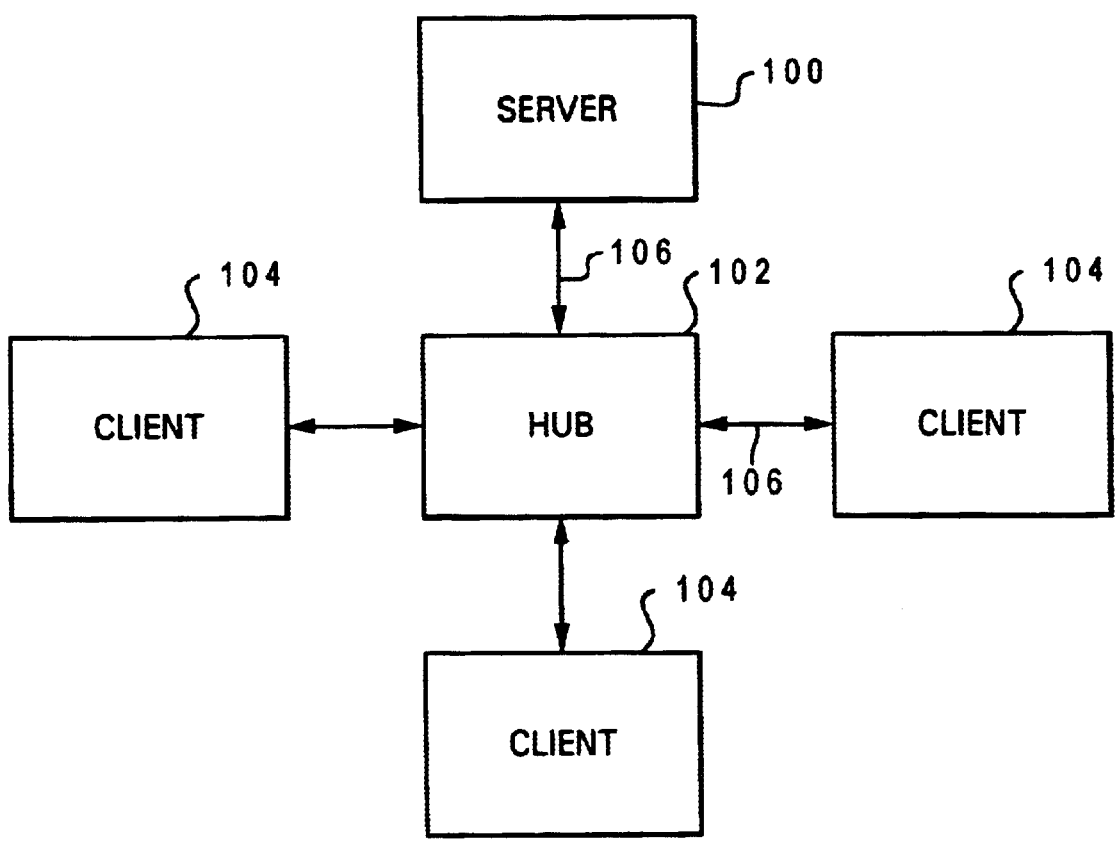
FIG. 1 illustrates a pictorial representation of a data processing system in accordance with the method and system of the present invention.

FIG. 1 illustrates a pictorial representation of a data processing system including a plurality of client computer systems 104 coupled to a server computer system 100 utilizing a hub 102 in accordance with the method and system of the present invention. Server computer system 100 and client computer systems 104 are connected to hub 102 utilizing a communication link 106. Communications link 106 may conform to a local area network standard such as the Ethernet specification, or may be a wide area network (WAN) utilizing a telephone network. Those skilled in the art will recognize that the invention described herein may be implemented utilizing any suitable type of datacommunications channel or link. In addition, communications link 106 may simultaneously include multiple different types of data communications channels.

Figure 2:
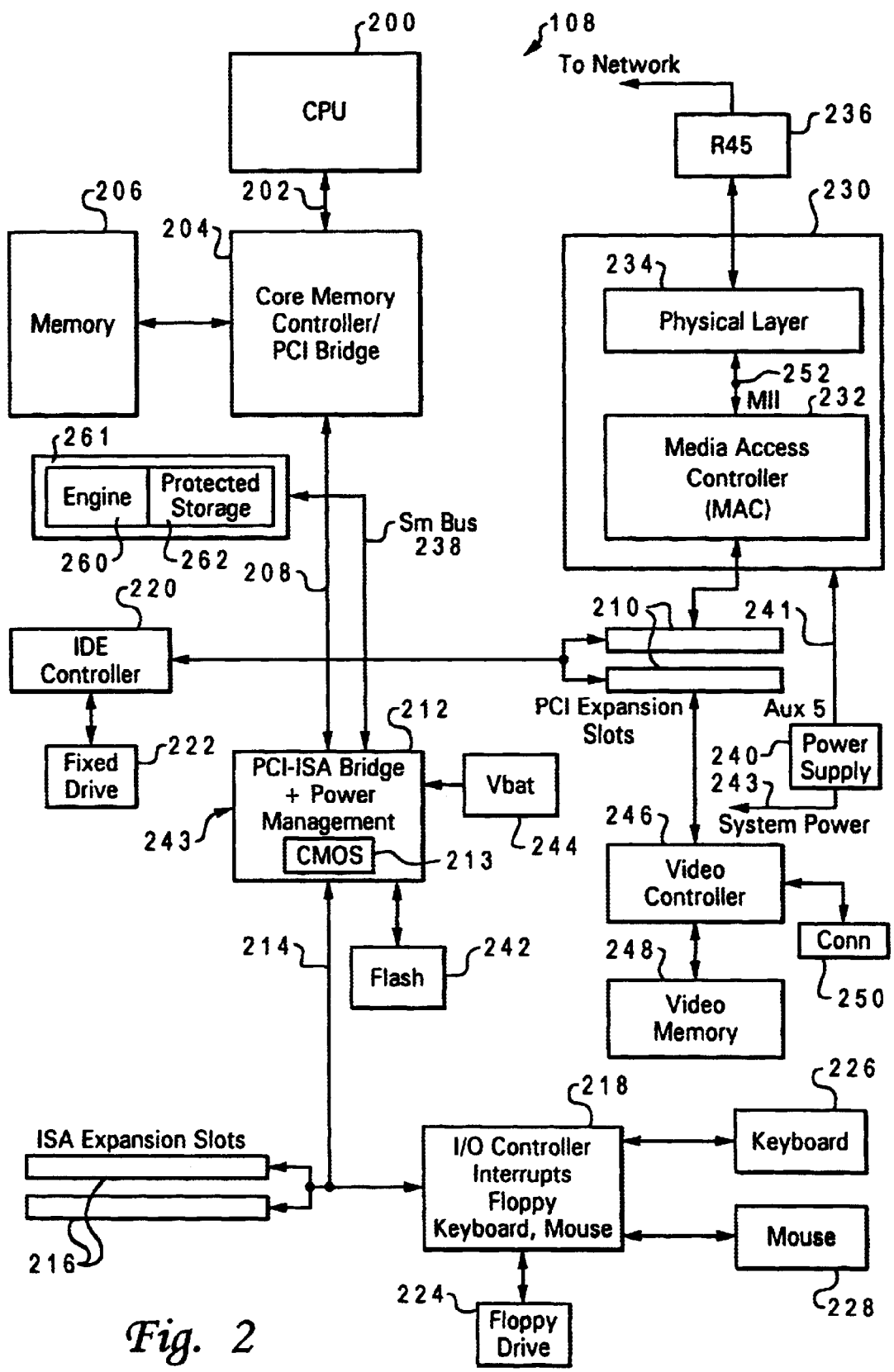
FIG. 2 depicts a more detailed pictorial representation of a client computer system in accordance with the method and system of the present invention.

FIG. 2 depicts a more detailed pictorial representation of a computer system 108 which may be utilized to implement a client computer system of FIG. 1 in accordance with the method and system of the present invention. Computer 108 includes a planar (also commonly called a motherboard or system board) which is mounted within computer 108 and provides a means for mounting and electrically interconnecting various components of computer 108 including a central processing unit (CPU) 200, system memory 206, and accessory cards or boards as is well known in the art.

CPU 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard. Architecture (ISA) bus bridge 204 are connected to PCI bus bridge 204 utilizing PCI bus 208. IDE controller 220 provides for the attachment of IDE compatible storage devices, such a removable hard disk drive 222. PCI/ISA bridge 212 provides an interface between PCI bus 208 and an optional feature or expansion bus such as the ISA bus 214. PCI/ISA bridge 212 includes power management logic. PCI/ISA bridge 212 is supplied power from battery 244 to prevent loss of configuration data stored in CMOS 213.

A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller .212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system.

Computer 108 includes a video controller 246 which may, for example, be plugged into one of PCI expansion slots 210. Video controller 246 is connected to video memory 248. The image in video memory 248 is read by controller 246 and displayed on a monitor (not shown) which is connected to computer 108 through connector 250.

Computer system 108 includes a power supply 240 which supplies full normal system power 243, and has an auxiliary power main AUX 5 241 which supplies full time power to the power management logic 212, and to a network adapter 230.

Network adapter 230 includes a physical layer 234 and a media access controller (MAC) 232 coupled together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234. Network adapter 230 may be plugged into one of the PCI connector slots 210 (as illustrated) or one of the ISA connector slots 216 in order to permit computer system 108 to communicating with server 100 utilizing communications link 106.

MAC 232 processes digital network signals, and serves as an interface between a shared data path, i.e. the MII Bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mbps CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network. In a preferred embodiment, physical layer 234 is implemented utilizing an Integrated Services chip ICS-1890.

Physical layer 234 includes auto-negotiation logic that serves three primary purposes. First, it determines the capabilities of computer system 108. Second, it advertises its own capabilities to server computer 100. Third, it establishes a connection with server computer 100 using the highest performance connection technology.

In accordance with the present invention, the planar includes an encryption device 261 which includes an encryption/decryption engine 260 which includes an encryption/decryption algorithm which is utilized to encode and decode messages transmitted and received by the planar, and protected storage 262. Engine 260 can preferably perform public private key encryption. Engine 260 may access a protected storage device 262. Protected storage device 262 is accessible only through engine 260. Priority information stored within storage 262 is protected by engine 260 and is not accessible to the planar or its components except through engine 260. Device 262 may be implemented utilizing an electronically erasable storage device, such as an EEPROM.

Encryption device 261, including engine 260 and EEPROM 262, is coupled to PCI-ISA bridge 212 utilizing a system management (SM) bus 238. System management bus 238 is a two-wire, low speed, serial bus used to interconnect management and monitoring devices. Those skilled in the art will recognize that encryption device 261 may be coupled to another bus within the planar.

FIG. 3 illustrates a high level flow chart which depicts establishing a unique client identifier for each client and encryption keys in accordance with the method and system of the present invention. The process starts as depicted at block 300 and thereafter passes to block 302 which illustrates establishing a server computer system encryption key pair including a server private key and a server public key. Next, block 304 depicts establishing a client computer system encryption key pair including a client private key and a client public key. Thereafter, block 306 illustrates establishing a unique identifier for the client computer system hardware which uniquely identifies the hardware. The unique identifier may be the UUID for the system, or may be a public/private RSA key pair associated with the system. The process then terminates as depicted at block 308.

Figure 4:
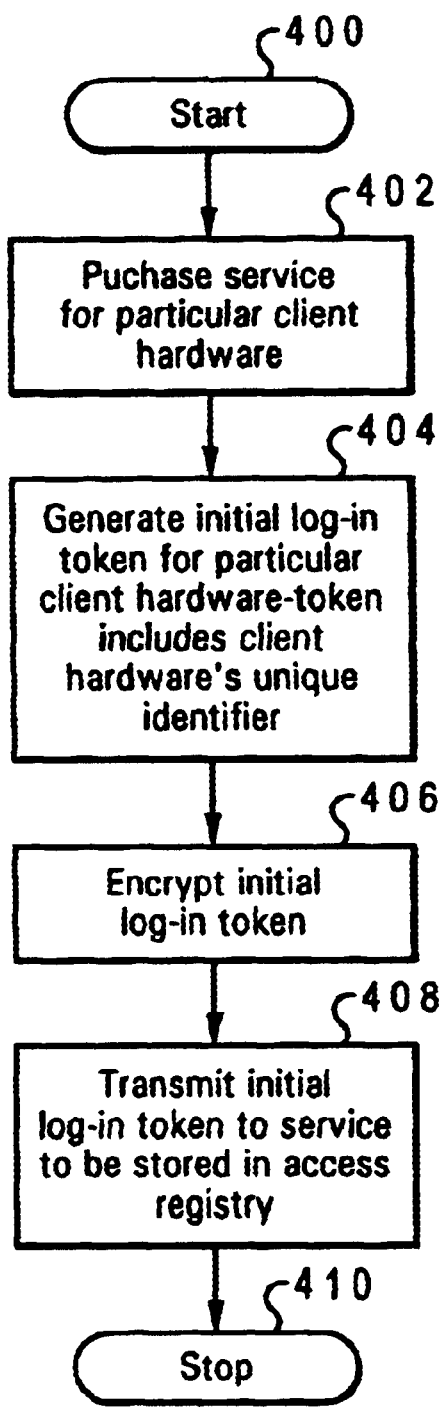
FIG. 4 depicts a high level flow chart which illustrates a client computer system generating and transmitting a log-in token to a service being executed on a server computer system to attempt to log-on to the service in accordance with the method and system of the present invention.

FIG. 4 depicts a high level flow chart which illustrates a client computer system generating and transmitting a log-in token to a service being executed on a server computer system to attempt to log-on to the service in accordance with the method and system of the present invention. The process starts as depicted at block 400 and thereafter passes to block 402 which illustrates purchasing a service for a particular client hardware. The particular client hardware becomes associated with the service after the purchase of the service. Next, block 404 depicts the client computer system generating an initial log-in token for a particular client hardware. The token includes the unique identifier which identifies the particular client computer hardware.

Thereafter, block 406 illustrates the client signing the initial log-in token by encrypting the token utilizing the client's private key. Next, block 408 depicts the client transmitting the encrypted initial log-in token to the server for the service to store in its access registry. The process then terminates as illustrated at block 410.

FIG. 5 illustrates a high level flow chart which depicts a server computer system establishing an access registry within a service executing on the server, and receiving log-in tokens from client computer systems in accordance with the method and system of the present invention. The process starts as depicted at block 500 and thereafter passes to block 502 which illustrates the service establishing an access registry within the service. The access registry is utilized by the service to store all preregistered log-in tokens which identify the particular client computer hardware which are approved to utilize the service.

Next, block 504 depicts the service, executing within the server, authenticating the client by receiving and decrypting initial log-in tokens. Thereafter, block 506 illustrates the service storing the decrypted tokens in the access registry. Once a log-in token has been received and stored within the access registry, the client hardware is associated with the token is registered and approved to log-on to and access the service. The process then terminates as depicted at block 508.

Figure 6:
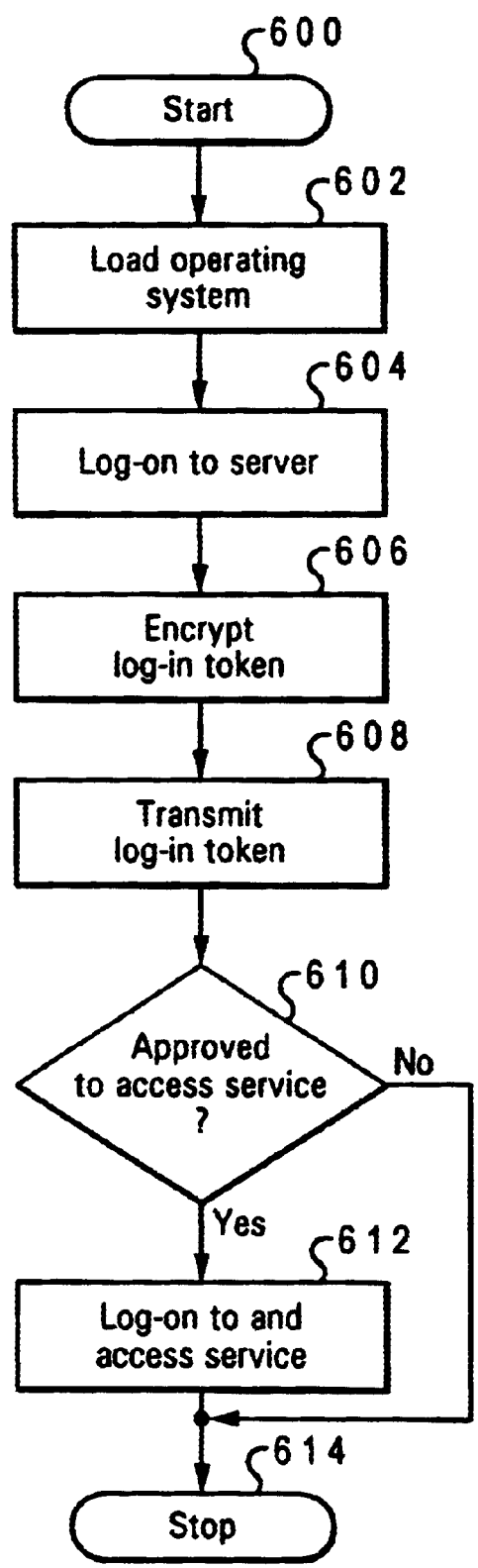
FIG. 6 depicts a high level flow chart which illustrates a client computer system attempting to access a service executing on a remote server by transmitting the client's log-in token in accordance with the method and system of the present invention.

FIG. 6 depicts a high level flow chart which illustrates a client computer system attempting to access a service executing on a remote server by transmitting the client's log-in token in accordance with the method and system of the present invention. The process starts as illustrated at block 600 and thereafter passes to block 602 which depicts the client computer system loading its operating system. Next, block 604 illustrates the client computer hardware logging-on to the server computer system. Thereafter, block 606 depicts the client encrypting its log-in token utilizing the client's private key and server's public key.

The process then passes to block 608 which illustrates the client transmitting its encrypted log-in token to the server computer system. Block 610, then, depicts a determination of whether or not the client computer hardware has received an approval to log-on to and access the service. If a determination is made that the client computer hardware has received an approval, the process passes to block 612 which illustrates the client computer hardware being permitted to log-on to and utilize the service. The process then terminates as depicted at block 614. Referring again to block 610, if a determination is made that the client computer hardware is not permitted to log-on to the service, the process terminates at block 614.

Figure 7:
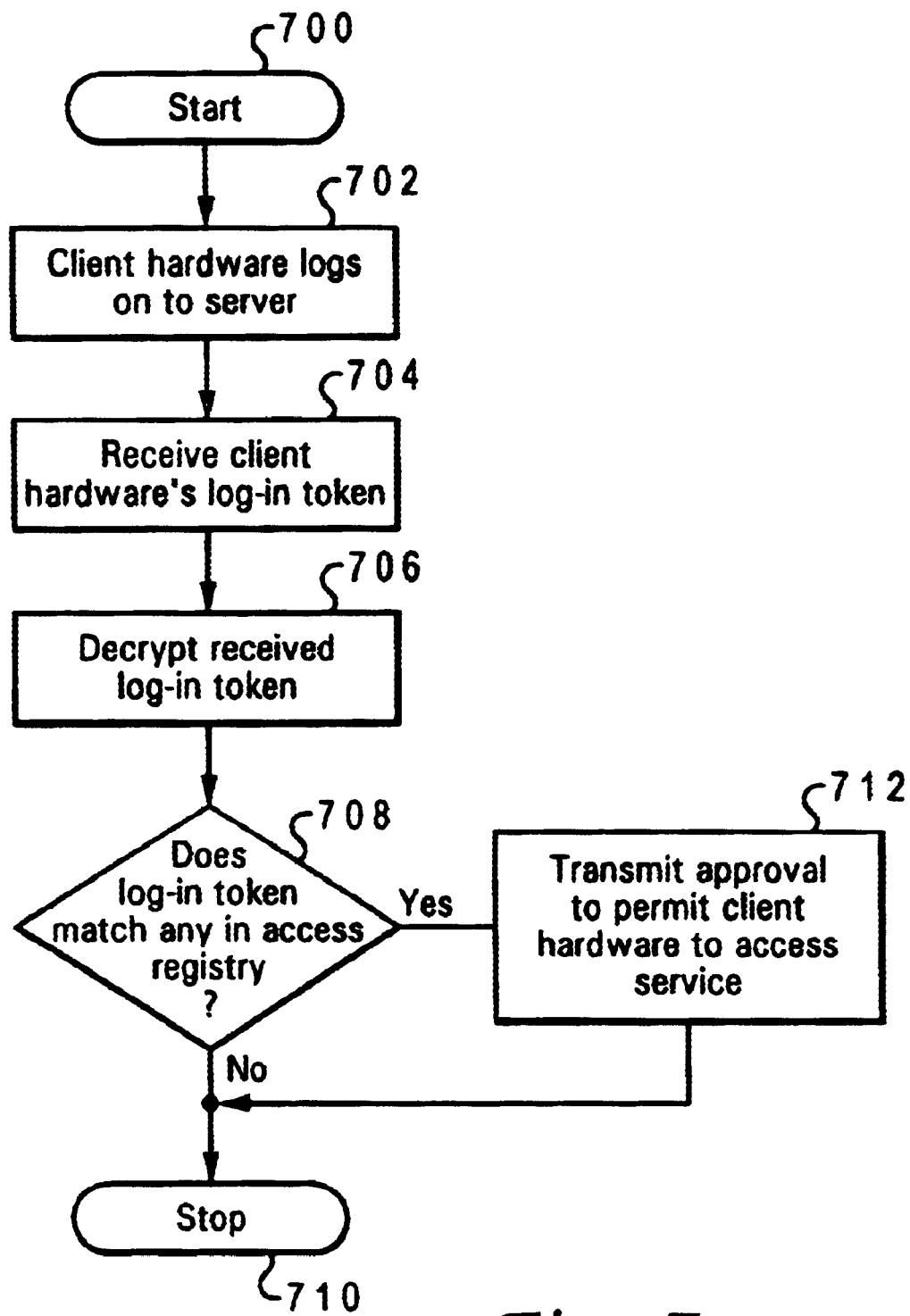
FIG. 7 illustrates a high level flow chart which depicts a server computer system receiving a log-in token and utilizing the token to determine whether to grant access to a service executing on the server in accordance with the method and system of the present invention.

FIG. 7 illustrates a high level flow chart which depicts a server computer system receiving a log-in token and utilizing the token to determine whether to grant access to a service executing on the server in accordance with the method and system of the present invention. The process starts as depicted at block 700 and thereafter passes to block 702, which illustrates the client computer hardware logging-on to the server computer system. Next, block 704 depicts the service receiving the client computer hardware's log-in token. Thereafter, block 706 illustrates the server computer system decrypting the received token utilizing the server's private key and the client's public key.

Next, block 708 depicts a determination of whether or not the received, decrypted token matches any of the initial tokens stored in the access registry. If a determination is made that the received log-in token does match one of the stored initial tokens, then the client computer hardware identified by the token is pre-approved to access and utilize the service. Block 712, then, illustrates the service transmitting an approval to the client computer hardware identified by the log-in token to utilize the service. The process then terminates as illustrated at block 710. Referring again to block 708, if a determination is made that the service is not able to match the received token to any token stored in the access registry, then the client hardware identified by the token is not registered to utilize the service. Therefore, the process terminates at block 710.

While a preferred embodiment has been particularly shown and described, it will be understood by those skilled in the art that various changes in form and detail may be made therein without departing from the spirit and scope of the present invention.

What is claimed is:

1. A method in a data processing system for permitting only preregistered client computer hardware to access a service executing on a remote server computer system, said method comprising the steps of:

establishing a log-in token including a unique identifier which identifies a particular client computer hardware;

said client computer hardware logging-on to said server computer system;

subsequent to said client computer hardware logging-on to said server computer system, said client computer hardware attempting to access said service;

during said attempt, said client computer hardware transmitting said log-in token to said server computer system;

said server computer system utilizing said unique identifier included within said log-in token to determine if said client computer hardware is registered to access said service;

in response to a determination that said client computer hardware is registered to access said service, said server computer system permitting said client computer hardware to access said service; and in response to a determination that said client computer hardware is not registered to access said service, said server computer system prohibiting said client computer hardware from accessing said service.

2. The method according to claim 1, further comprising the steps of:

permitting a user to purchase said service for said client computer hardware;

subsequent to said purchase, said client computer hardware becoming registered with said service by transmitting an initial log-in token to said service, wherein only client computer hardware for which said service was purchased is permitted to be registered with said service, said initial identifier identifying said client computer hardware; and said service storing said initial log-in token in an access registry.

3. The method according to claim 2, further comprising the step of establishing said log-in token including a serial number which uniquely identifies said particular client computer hardware.

4. The method according to claim 2, further comprising the step of establishing said log-in token including a warranty number which uniquely identifies said particular client computer hardware.

5. The method according to claim 2, further comprising the step of establishing said log-in token including a contract number which uniquely identifies said particular client computer hardware.

6. The method according to claim 3, wherein said step of said server computer system utilizing said log-in token to determine if said client computer hardware is registered to access said service further comprises the steps of:

said server computer system comparing said initial log-in token with contents of said access registry;

in response to said log-in token being the same as a log-in token included within said access registry, said server computer system determining that said client computer hardware is registered to access said service; and in response to said log-in token being different from all log-in tokens stored in said access registry, said server computer system determining that said client computer hardware is not registered to access said service.

7. The method according to claim 6, further comprising the steps of:

establishing an encryption device within said client computer system; and said encryption device encrypting said log-in token prior to said client computer system transmitting said login token to said server computer system.

8. The method according to claim 7, further comprising the step of said encryption device encrypting said initial log-in token prior to said client computer system transmitting said log-in token to said server computer system.

9. The method according to claim 8, further comprising the step of establishing a log-in token including a unique identifier which identifies a particular client computer hardware, said unique identifier being a UUID associated with said particular client hardware.

10. The method according to claim 9, further comprising the step of establishing a log-in token including a unique identifier which identifies a particular client computer hardware, said unique identifier being private/public key pair UUID associated with said particular client hardware.

11. A data processing system for permitting only preregistered client computer hardware to access a service executing on a remote server computer system, said method comprising the steps of:

said system executing code for establishing a log-in token including a unique identifier which identifies a particular client computer hardware;

said client computer hardware executing code for logging-on to said server computer system;

subsequent to said client computer hardware logging-on to said server computer system, said client computer hardware executing code for attempting to access said by service;

during said attempt, said client computer hardware executing code for transmitting said log-in token to said server computer system;

said server computer system executing code for utilizing said unique identifier included within said log-in token to determine if said client computer hardware is registered to access said service;

in response to a determination that said client computer hardware is registered to access said service, said server computer system executing code for permitting said client computer hardware to access said service; and in response to a determination that said client computer hardware is not registered to access said service, said server computer system executing code for prohibiting said client computer hardware from accessing said service.

12. The system according to claim 11, further comprising:
said server computer system executing code for permitting a user to purchase said service for said client computer hardware;
subsequent to said purchase, said client computer hardware executing code for becoming registered with said service by transmitting an initial log-in token to said service, wherein only client computer hardware for which said service was purchased is permitted to be registered with said service, said initial identifier identifying said client computer hardware; and
said service executing code for storing said initial log-in token in an access registry.

13. The system according to claim 12, further comprising said system executing code for establishing said log-in token including a serial number which uniquely identifies said particular client computer hardware.

14. The system according to claim 13, further comprising said system executing code for establishing said log-in token including a warranty number which uniquely identifies said particular client computer hardware.

15. The system according to claim 14, further comprising said system executing code for establishing said log-in token including a contract number which uniquely identifies said particular client computer hardware.

16. The system according to claim 15, wherein said server computer system executing code for utilizing said log-in token to determine if said client computer hardware is registered to access said service further comprises:
said server computer system executing code for comparing said initial log-in token with contents of said access registry;
in response to said log-in token being the same as a log-in token included within said access registry, said server computer system executing code for determining that said client computer hardware is registered to access said service; and
in response to said log-in token being different from all log-in tokens stored in said access registry, said server computer system executing code for determining that said client computer hardware is not registered to access said service.

17. The system according to claim 16, further comprising:
an encryption device included within said client computer system; and
said encryption device executing code for encrypting said log-in token prior to said client-computer system transmitting said log-in token to said server computer system.

18. The system according to claim 17, further comprising said encryption device executing code for encrypting said initial log-in token prior to said client computer system transmitting said log-in token to said server computer system.

19. The system according to claim 18, further comprising said system executing code for establishing a log-in token including a unique identifier which identifies a particular client computer hardware, said unique identifier being a UUID associated with said particular client hardware.

20. The system according to claim 19, further comprising said system executing code for establishing a log-in token including a unique identifier which identifies a particular client computer hardware, said unique identifier being private/public key pair UUID associated with said particular client hardware.

21. A data processing system for permitting only preregistered client computer hardware to access a service executing on a remote server computer system, said method comprising the steps of:
said system executing code for establishing a log-in token including a serial number which identifies a particular client computer hardware;
said client computer hardware executing code for logging-on to said server computer system;
subsequent to said client computer hardware logging-on to said server computer system, said client computer hardware executing code for attempting to access said service;
during said attempt, said client computer hardware executing code for transmitting said log-in token to said server computer system;
said server computer system executing code for utilizing said serial number to determine if said client computer hardware is registered to access said service;
in response to a determination that said client computer hardware is registered to access said service, said server computer system executing code for permitting said client computer hardware to access said service;
in response to a determination that said client computer hardware is not registered to access said service, said server computer system executing code for prohibiting said client computer hardware from accessing said service;
said server computer system executing code for permitting a user to purchase said service for said client computer hardware;
subsequent to said purchase, said client computer hardware executing code for becoming registered with said service by transmitting an initial log-in token to said service, wherein only client computer hardware for which said service was purchased is permitted to be registered with said service, said initial identifier identifying said client computer hardware;
said service executing code for storing said initial log-in token in an access registry;
said server computer system executing code for utilizing said log-in token to determine if said client computer hardware is registered to access said service further comprises:
said server computer system executing code for comparing said initial log-in token with contents of said access registry;
in response to said log-in token being the same as a log-in token included within said access registry, said server computer system executing code for determining that said client computer hardware is registered to access said service;
in response to said log-in token being different from all log-in tokens stored in said access registry, said server computer system executing code for determining that said client computer hardware is not registered to access said service;
an encryption device included within said client computer system;
said encryption device executing code for encrypting said log-in token prior to said client computer system transmitting said log-in token to said server computer system; and
said encryption device executing code for encrypting said initial log-in token prior to said client computer system transmitting said log-in token to said server computer system.

* * * * *